Patented Nov. 2, 1948

2,453,102

UNITED STATES PATENT OFFICE 2,453,102

3,4-DIHYDROXYTHIOPHENE-2,5-DICARBOXYLIC ACID PRODUCTION

Stockton Graeme Turnbull, Jr., Wilmington, Del., assignor to E. I. du Pont de Nemours & Company, Wilmington, Del., a corporation of Delaware No Drawing. Application February 25, 1944, Serial No. 523,914

2 Claims. (Cl. 260—329)

This invention relates to new derivatives of thiophene and more particularly refers to compounds conforming to the following general formula:

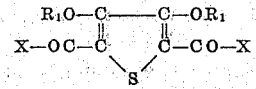

wherein $R_1$ represents hydrogen, a hydrocarbon radical or an acyl group, and X represents a hydroxyl or amino group.

The prior art discloses various thiophene derivatives, all of which are dissimilar to those hereinafter described. For example, Hinsberg, Berichte 43, 901 (1910); Berichte 45, 2413 (1912) refers to a process for the saponification of 3,4-dihydroxy - 2,5 - dicarbomethoxy - (and ethoxy) thiophene in sodium ethoxide solution in order to obtain the 3,4-dihydroxy-2-carbomethoxy-(and ethoxy) thiophenes. The yield in this reaction is extremely low, and it is difficult—if not impossible—to control it.

The saponification process hereafter described is surprisingly superior to the foregoing. The reasons therefor are as follows:

1. The reaction is easily controlled.
2. Due to the relatively large amounts of sodium acetate present, the reaction mixture is sufficiently buffered to prevent oxidation of the product. In Hinsberg's saponification reaction much tarry resin is formed because of oxidation of the unstable reaction product.
3. The saponification products of the present invention are stable, well-defined and easily purified, in contrast to those of Hinsberg.
4. The saponification products of this invention are easily decarboxylated, and can be subjected to a much wider variety of reactions than those of Hinsberg.

It is an object of this invention to produce new derivatives of thiophene which are particularly useful in the industrial arts, especially as intermediates for the preparation of pharmaceuticals. An additional object is to produce these compounds by simple and expeditious processes. Additional objects will become apparent from a consideration of the following description and claims.

These objects are obtained by the present invention, wherein compounds conforming to the following general formula are produced:

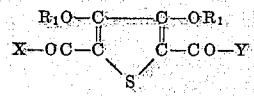

wherein $R_1$ represents hydrogen, a hydrocarbon radical or an acyl group; X represents a hydroxyl or amino group; and Y represents a hydroxyl, amino or o-alkyl group. In a more restricted sense this invention is concerned with compounds such as the 3,4-dihydroxythiophene-2,5-dicarboxylic acid, the 3,4-diacetoxythiophene-2,5-dicarboxylic acid, and the 3,4-dimethoxythiophene-2,5-dicarboxylic acid. Another embodiment of this invention pertains to processes for the production of the foregoing compounds whereby a 3,4-dihydroxy-2,5-dicarbalkoxythiophene is de-esterified. In a still more restricted embodiment this invention is concerned with saponification to obtain the foregoing compounds by sodium hydroxide in sodium acetate fusion. In another embodiment the invention is directed to the further treatment of the saponified compounds to produce ester or ether derivatives thereof.

The invention may be more readily understood by a consideration of the following illustrative examples wherein the quantities are stated in parts by weight:

EXAMPLE 1

*3,4-dihydroxy-2,5-dicarboxythiophene*

A homogenous melt of 40 parts of solid caustic in 320 parts of sodium acetate trihydrate was prepared at 120° C. With agitation 20 parts of 3,4-dihydroxy-2,5-dicarbethoxythiophene was sprinkled in by hand at 110–120° C.; small amounts of water were added and the melt was continually agitated to prevent caking on the bottom of the gas-fired pan; the temperature was maintained at 110–120° C. for one-half hour; and then for three hours at 90–100° C. The hot melt was poured into 1000 parts of water and this was agitated until complete solution had been effected. The wine-colored solution was made strongly acid with HCl and the product was extracted into ether. After washing with water to remove most of the acetic acid, the ether extract was dried and concentrated to yield 24 parts of pink crystals that still retained some acetic acid. By recrystallization from 40 parts of methanol there was obtained 14.6 parts (93% yield) of white crystals that darkened at 170° C. and melted with decomposition slightly above 190° C.

Calc. for $C_6H_4O_6S$: C, 35.32; H, 1.96; S, 15.67; found: C, 35.44; H, 2.03; S, 15.56.

This new 3,4-dihydroxy-2,5-dicarboxythiophene is quite soluble in water. It gives a light yellow solution in caustic and is not precipitated with dilute acid. It gives a deep blue solution in alcoholic ferric chloride. It is quite soluble in most oxygenated solvents, but is not appreciably soluble in benzene or petroleum ether.

The same product is obtained in similar yield by a like process using 3,4-dihydroxy-2,5-dicarbomethoxythiophene.

In the foregoing processes other saponifying agents than those mentioned may be used with excellent results. For example, alkaline hydroxides generally in buffering agents such as alkaline formates, propionates, borates, phosphates, carbonates, tartrates, etc., may be employed.

EXAMPLE 2

*Diamide of 3,4-dihydroxy-2,5-dicarboxythiophene*

5.2 parts of 3,4-dihydroxy-2,5-dicarbethoxythiophene was heated in 25 parts (when liquid) of ammonia in a glass-lined steel bomb at 115–130° C. for 16 hours. There was obtained 1.2 parts of the diamide of 3,4-dihydroxy-2,5-dicarboxythiophene as a caustic-insoluble, acid-insoluble product that melted above 250° C.

Calc. for $C_6H_6O_4SN_2$: N, 13.8; found: N, 14.5.

The same product was obtained by heating 5.2 parts of 3,4-dihydroxy-2,5-dicarbethoxythiophene with 5.4 parts of ammonium sulfite mono-hydrate in 13.4 parts of conc. ammonium hydroxide and 25 parts of water for 16 hours at 115–130° C. in a glass-lined steel bomb.

EXAMPLE 3

*3,4-dimethoxy-2,5-dicarboxythiophene*

65 parts of 3,4-dhydroxy-2,5-dicarbethoxythiophene was dissolved in a nitrogen atmosphere in a solution of 28 parts of KOH in 2500 parts of water. With agitation over 20 minutes 61 parts of dimethyl sulfate was added, followed by another 28 parts of KOH. Dimethyl sulfate and KOH were then added in 5 portions of 58.5 parts and five portions of 34 parts respectively, over 3.5 hours without external cooling. The temperature rose to 52° C. After the final addition of the KOH the solution was agitated at 50° C. for one-half hour and was then cooled to 20° C. The solution had become bright red from its initial canary yellow, and was still alkaline to Brilliant Yellow. Extraction with ether gave a mere trace of caustic-insoluble yellow oil. The aqueous layer was acidified with conc. HCl until strongly acid to Congo red, and was then extracted with a total of 2850 parts of ether, which gave 19.4 parts of yellowish pink crystals that proved to be the dimethyl ether of 3,4-dihydroxy-2,5-dicarboxythiophene which is described below. The aqueous layer, remaining after the ether extractions, was repeatedly extracted with chloroform, which upon drying and concentration gave 45 parts of yellow crystals that melted at 152–155° C. This material is quite soluble in water and insoluble in organic solvents such as methanol, acetone, etc. When recrystallized from dioxane yellow crystals that melted at 171–173° C. resulted. No structure has yet been assigned to this material, which had the analysis:

C, 48.40; H, 5.50; S, 10.29.

The 3,4-dimethoxy-2,5-dicarboxythiophene obtained by ether extraction as described above was purified by recrystallization from methanol, and then melted with decomposition at 295–300° C. The material is soluble in most of the usual organic solvents, but only slightly so in toluene, chloroform and hexane.

Calc. for $C_8H_8O_6S$: C, 41.37; H, 3.45; S, 13.8; found: C, 41.12; H, 3.43; S, 13.65.

This same compound was also prepared by methyl iodide methylation, with saponification, of the di-soda phenate of 3,4-dihydroxy-2,5-dicarbethoxythiophene in methanol, but the yield was low.

EXAMPLE 4

*Diacetate of 3,4-dihydroxy-2,5-dicarboxythiophene*

Five parts of 3,4-dihydroxythiophene-2,5-dicarboxylic acid was suspended in 40 parts of anhydrous benzene and 10 parts of acetic anhydride was added. The suspension was heated under reflux for 2.5 hours. Gradually most of the material dissolved, and towards the end the diacetate crystallized. There was obtained on cooling 4.5 parts (80% of theory) of white crystals that melted at 314–315° C. with decomposition when recrystallized from acetic acid.

Calc. for $C_{10}H_8O_8S$: C, 41.68; H, 2.78; S, 11.10; found: C, 41.61; H, 2.96; S, 10.57.

The diacetate is quite soluble in methanol and acetone, and insoluble in benzene.

EXAMPLE 5

*3,4 - dihydroxy - 2 - carboxy - 5 - carbomethoxy-thiophene*

The methanolic mother liquor obtained from the isolation of 3,4-dihydroxy-2,5-dicarboxythiophene, when prepared by sodium acetate-sodium hydroxide saponification of 3,4-dihydroxy-2,5-dicarbomethoxythiophene as described in Example 1, was concentrated to 15 parts, whereupon 1.8 g. of tan crystals formed. Upon recrystallization from methanol the 3,4-dihydroxy-2-carboxy-5-carbomethoxythiophene was obtained as white crystals that melted with decomposition at 178–180° C.

Calc. for $C_7H_6O_6S$: C, 38.52; H, 2.75; S, 14.68; found: C, 38.28; H, 2.61; S, 14.79.

It is to be understood that the foregoing examples are representative merely of a few of the many embodiments of this invention. They may be varied widely with respect to the individual reactants, the amounts thereof and the conditions of reaction without departing from the scope hereof.

As previously mentioned, the compounds of this invention are free 3,4-dihydroxythiophene-2,5-dicarboxylic acids and ethers and esters thereof, wherein the hydroxyl groups are etherified or esterified. These compounds, for the most part, conform to the following general formula:

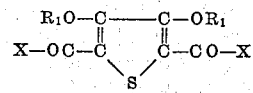

wherein $R_1$ represents hydrogen, an acyl group or a hydrocarbon radical such as an alkyl group, an aryl group or an aralkyl group, and X represents a hydroxyl or an amino group. In place of the radicals or groups referred to in the examples it is to be understood that the foregoing substituents may represent any of the numerous other radicals or groups included within the broad categories mentioned. Likewise it is to be understood that while both groups represented by $R_1$ will generally be the same, it is contemplated that they may be dissimilar. The same is also true for the groups represented by X.

The foregoing compounds may be produced in accordance with the processes illustrated by the examples. In particular, it has been found that they may be readily produced by the sodium acetate-sodium hydroxide fusion which is represented by Example 1. After saponification of the compounds it is to be understood that the resulting compounds may be esterified or etherified to produce valuable derivatives thereof.

These compounds are particularly valuable in the pharmaceutical field, especially in the preparation of vitamins. It is also contemplated that they may be used in other fields, such as photographic developers, dye intermediates, metal deactivators, intermediates for the manufacture of synthetic fibres, etc.

Several other useful classes of thiophene derivatives are described and claimed in copending applications Serial Nos. 523,913, now abandoned, 523,915 and 523,916, now Patent 2,442,027.

As many widely different embodiments of this invention may be made without departing from the spirit and scope hereof, it is to be understood that the invention is not limited to the specific embodiments hereof except as defined in the appended claims.

I claim:

1. A process for producing 3,4-dihydroxythiophene-2,5-dicarboxylic acid, which comprises fusing 3,4-dihydroxy-2,5-dicarbethoxythiophene with sodium hydroxide in sodium acetate at temperatures between about 90° and about 120° C.

2. A process as claimed in claim 1 wherein small amounts of water are added and the melt is continually agitated during the fusion.

STOCKTON GRAEME TURNBULL, Jr.

REFERENCES CITED

The following references are of record in the file of this patent:

UNITED STATES PATENTS

| Number | Name | Date |
|---|---|---|
| 2,085,065 | Andersen | June 29, 1937 |
| 2,157,796 | Muth | May 9, 1939 |

OTHER REFERENCES

Hinsberg, Berichte 43, 9-1-906 (1910).
Hinsberg, Berichte 45, 2413-18 (1912).
Alles, J. Pharm. J. Exp. Ther. 72, 265-75 (1941).
Karrer "Organic Chemistry," 104, 171, Nordeman Publisher, N. Y. 1938.